United States Patent Office 3,574,648
Patented Apr. 13, 1971

3,574,648
METHOD FOR THE PRODUCTION OF SYNTHETIC CALCIUM SULFATE HEMIHYDRATE
Franz Wirsching, Bruno Wandser, and Karl Knauf, Iphofen, Germany, assignors to Gebr. Knauf Westdeutsche Gipswerke, Iphofen, Middle Franconia, Germany
Continuation-in-part of application Ser. No. 279,667, May 9, 1963. This application Dec. 18, 1967, Ser. No. 691,372
Int. Cl. C04b *11/02, 11/08*
U.S. Cl. 106—110      3 Claims

ABSTRACT OF THE DISCLOSURE

By-product gypsum arising in the extraction of phosphorus-containing minerals and contaminated with phosphoric acid and its water-soluble salts is calcined, the calcine is treated with water and a neutralising agent to form calcium sulfate dihydrate and water-insoluble compounds of the contaminants and the dihydrate is subjected to a second calcination to produce a synthetic calcium sulfate hemihydrate which has properties comparable to or better than those of plaster of Paris derived from natural gypsum.

---

Figure 1:
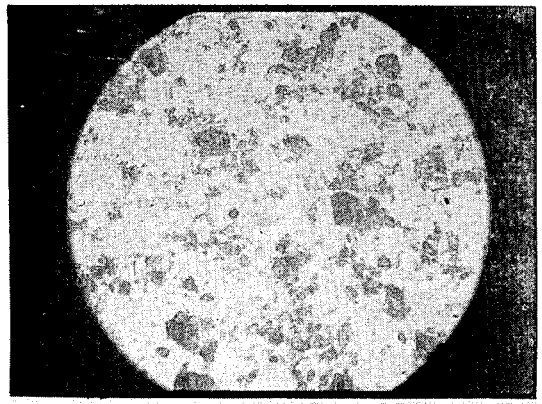

The invention relates to a process for manufacturing synthetic calcium sulfate hemihydrate from the by-product gypsum arising in the extraction of phosphorus-containing minerals and contaminated with water soluble phosphoric acids and water-soluble phosphates, and is a continuation-in-part of our application Ser. No. 279,667 filed May 9, 1963, now forfeited.

Such a contaminated by-product gypsum may have the following chemical composition:

| | Weight percent |
|---|---|
| Calcium sulphate dihydrate (gypsum) | About 96–98 |
| Insoluble phosphorus pentoxide | About 0.7 |
| Fluorine | About 0.8 |
| Silicon dioxide | About 0.8 |
| Aluminium oxide | About 0.1 |
| Iron oxide | About 0.2 |

Large quantities of this product are prepared in a powdery state.

The contaminated by-product gypsum contains acids, and water-soluble acid salts of these acids, of which the most essential and important are phosphoric acid and primary calcium phosphate which, being contained within the crystalline grains, cannot be removed by washing.

When calcium sulfate hemihydrate is worked up by mixing it with water it is hydrated to form calcium sulfate dihydrate and solidifies to form a solid mass of gypsum. Calcium sulfate hemihydrate is produced by treating calcium sulfate dihydrate in a suitable way (for instance by crushing or screening) and by calcining it to form calcium sulfate hemihydrate. Through this appropriate treatment, before or during calcining, a calcium sulfate hemihydrate is produced which in the working up, or when it has been worked up, shows advantageous properties. Calcium sulfate hemihydrate is produced in accordance with the invention by calcining contaminated calcium sulfate dihydrate (by-product gypsum) a first time to form calcium sulfate hemihydrate, by then hydrating this calcium sulfate hemihydrate to form calcium sulfate dihydrate and by calcining this calcium sulfate dihydrate a second time to form calcium sulfate hemihydrate. This twice calcined calcium sulfate hemihydrate possesses a high specific surface area, it has little volumetric weight both during and after its working up, and is of better quality than plaster of Paris.

The present invention concerns a method for the production of synthetic calcium sulfate hemihydrate from calcium sulfate dihydrate contaminated with water-soluble phosphoric acid or its water-soluble salts, in which method the contaminated calcium sulfate dihydrate is first subjected to a calcining treatment by which it is converted into a gypsum intermediate product contaminated with water-soluble phosphoric acid or its water-soluble salts; this contaminated gypsum intermediate product is then mixed with water and with a neutralising agent; and finally this mixture is dehydrated by calcining to form the synthetic calcium sulfate hemihydrate.

Hereafter, for the expression "calcium sulfate dihydrate contaminated with water-soluble phosphoric acid or its water-soluble salts" the abbreviation "contaminated dihydrate" will be used. Also for the expression "synthetic calcium sulfate hemihydrate" the abbreviation "synthetic hemihydrate" will be used.

Natural gypsum is a calcium sulfate dihydrate without contamination through phosphoric acid or its water soluble salts. When natural gypsum is calcined, one obtains plaster of Paris which chemically is substantially calcium sulfate hemihydrate.

When calcium sulfate hemihydrate, which can be synthetic hemihydrate or plaster of Paris, is worked up after its production, it is mixed with water. Thereby it becomes pourable or mouldable and is hydrated to form calcium sulfate dihydrate. This calcium sulfate dihydrate solidifies to a comparatively solid mass of gypsum which consists of small gypsum crystals, which are finely fibrous and closely matted together. Natural gypsum and the contaminated dihydrate are accordingly calcined, because the product obtained through calcination solidifies after mixing with water to a comparatively solid mass of gypsum.

Calcium sulfate hemihydrate is used in particular in the building industry. In this connection the calcium sulfate hemihydrate is stirred with water to form a plastic mass. This plastic mass, either alone or with further materials, is worked up as gypsum mortar to form a plaster or moulded part.

If the contaminated dihydrate is merely calcined, one obtains a synthetic hemihydrate which is not usable, or at least has considerably worse properties than plaster of Paris. Accordingly numerous methods have been developed for the production of synthetic hemihydrate from contaminated dihydrate in order to produce a synthetic hemihydrate with a property as good as that of plaster of Paris. In these known methods the contaminated dihydrate before calcining is mixed with a neutralising agent. This mixture is then calcined.

In a method known from U.S. patent specification 1,900,381, contaminated dihydrate is initially mixed with water to form a slurry. This slurry is compacted by means of a Dorr compactor and by centrifuging. In this known method accordingly, as contaminated gypsum intermediate product, there is compacted, still moist contaminated dihydrate. A similar method is also described in U.S. patent specification 1,937,292, where the contaminated dihydrate is first washed and dried and there is likewise present as contaminated gypsum intermediate product, dried contaminated dihydrate.

An advantage of the known method of the above mentioned type is that the synthetic hemihydrate produced in accordance with this method is a product which has already been subjected to measures for neutralization, i.e. for making the water-soluble phosphoric acid or its water-soluble salts inoperative. A synthetic hemihydrate produced in accordance with a method of the above mentioned known type can be worked up like plaster of Paris. The synthetic hemihydrates produced in accordance with the known method of the above mentioned type all, however, possess worse properties than plaster of Paris.

It is also known merely to calcine the contaminated dihydrate initially, so that contaminated calcium sulfate hemihydrate is deposited. In use water and a neutralizing agent is added to this contaminated calcium sulfate hemihydrate in order to make ineffective and to do away with the phosphoric acid and its water-soluble salts and in order to hydrate the calcium sulfate hemihydrate to form calcium sulfate dihydrate. Such a method is described in Chemical Abstracts, volume 52, 10535h and in U.S. Pat. 3,159,497.

Accordingly, in using contaminated calcium sulfate hemihydrate one must always take care how much neutralizing agent has to be mixed with the contaminated calcium sulfate hemihydrate. It is accordingly more convenient to use a synthetic hemihydrate which has been produced in accordance with a method of the first described type.

The object of the present invention is to produce a synthetic hemihydrate which is suitable for the building trade exactly in the way plaster of Paris is. Accordingly, the object of the invention is to produce a synthetic hemihydrate in which no primary calcium phosphate is enclosed in the calcium sulfate hemihydrate crystals.

In particular, however, the invention aims at producing a synthetic hemihydrate whose specific surface area in cm.$^2$/gm. is greater than was previously the case. Accordingly the invention aims at producing a synthetic hemihydrate which in and after its working up possesses less volumetric weight than was previously the case, i.e. after its working up is lighter than previously.

In the method of the invention, the contaminated calcium sulfate dihydrate is initially subjected to calcination, in which the contaminated calcium sulfate hemihydrate is deposited as contaminated gypsum intermediate product, which then, mixed with water and the neutralizing agent, is hydrated to form calcium sulfate dihydrate which is then calcined to form the synthetic hemihydrate.

The neutralizing agent which is used in the method may be selected from the group consisting of lime (CaO); hydrate of lime (Ca(OH)$_2$) or cement which contains lime, (for instance portland cement containing 63% CaO, 21% SiO$_2$, 7% Al$_2$O$_3$ and other constituents); urotropin; ferric ions; ferric sulfate; and mixtures of these.

The synthetic hemihydrate produced in accordance with the method of the invention has a specific surface area (in cm.$^2$ per g.) which is greater than that of plaster of Paris, of contaminated calcium sulfate hemihydrate or of synthetic hemihydrate produced in accordance with known methods. Therefore the synthetic hemihydrate in accordance with the invention is more pliable and has improved working up properties.

A gypsum mass obtained from the synthetic hemihydrate in accordance with the invention has volumetric weight which is approximately 25% to 30% less (in g. per cm.$^3$) than a gypsum mass obtained from plaster of Paris. Accordingly a gypsum mass from the synthetic hemihydrate in accordance with the invention has large inclusions of air, which improves the heat insulation.

A gypsum mass from synthetic hemihydrate in accordance with the invention has less volumetric weight than a gypsum mass from plaster of Paris. Therefore the constructions which the gypsum masses have to carry can be lighter construction than previously.

In plastering a wall with gypsum mass from the synthetic hemihydrate in accordance with the invention, per unit of surface and with equal thickness of plaster, less weight has to be applied to the wall. Accordingly with the same amount by weight of synthetic hemihydrate in accordance with the invention, with the same plaster thickness more surface areas are plastered than with the same amount by weight of plaster of Paris. The by-product hemihydrate in accordance with the invention is therefore more productive. A gypsum mass from the synthetic hemihydrate in accordance with the invention, which per unit of surface is as heavy as a gypsum mass from plaster of Paris, has greater compactness (or thickness) and therefore has an improved heat insulation effect.

The synthetic hemihydrate produced in this way does not contain any free phosphoric acid and no longer contains any phosphoric acid compounds soluble in water, and therefore no longer has the disadvantages of the synthetic hemihydrate produced in accordance with the known methods, and its behaviour is surprisingly as good as and in part considerably better than plaster of Paris obtained from natural gypsum. The advantages of the synthetic hemihydrate produced in accordance with the method of the invention can be seen in detail from the following description.

Figure 2:

The invention will now be described in detail with reference to FIGS. 1 and 2 which are 125× magnification photographs and FIG. 3 which shows solidification curves. FIG. 1 shows synthetic hemihydrate in accordance with the invention and FIG. 2 shows known once calcined synthetic hemihydrate. The invention will also be described with reference to FIG. 3 which shows the course of the stiffening time of known plaster of Paris and of synthetic hemihydrate in accordance with the invention.

In the following description, the materials referred to were prepared as follows:

Plaster of Paris: Calcium sulfate hemihydrate produced from natural gypsum by calcining at temperatures between 150° C. and 200° C. (commercial product).

Once-calcined synthetic hemihydrate: Calcium sulfate hemihydrate produced from contaminated dihydrate by calcining at temperatures between 150° and 200° C. (as for plaster of Paris) without measures for neutralization of phosphoric acid or its water-soluble salts.

Synthetic hemihydrate in accordance with the invention: Twice calcined calcium sulfate hemihydrate produced from contaminated dihydrate by calcining at temperatures between 150° and 200° C., neutralising by addition of 20 kg. lime and 180 kg. water to 1000 kg. of the contaminated gypsum intermediate product, mixing being carried out over a granulator, and calcining for a second time at temperatures between 150° C. and 200° C.

The three hemihydrates were subjected to a grinding process and a screening process after calcination, in order to grind them to the fineness necessary for practical purposes and remove the coarse grains.

The specific surface area of a calcium sulfate hemihydrate is an important quality characteristic. The higher the figure for the specific surface area is, the finer is the calcium sulfate hemihydrate and accordingly the better its properties in working up. In particular the pliability and plasticity of a calcium sulfate hemihydrate prepared with water is considerably improved by a large specific surface area. In Table 1 the specific surface area, determined in accordance with the Blaine method and also in accordance with the Brunauer/Emmet/Teller (BET) method, are supplied for plaster of Paris, once calcined synthetic hemihydrate and synthetic hemihydrate in accordance with the invention.

TABLE 1

| | Specific surface area (cm.$^2$/g.) | |
|---|---|---|
| | In accordance with Blaine method | In accordance with BET method |
| Plaster of Paris | 10,000 | 51,000 |
| Once calcined synthetic hemihydrate | 6,000 | 28,000 |
| Synthetic hemihydrate in accordance with the invention | 16,000 | 83,000 |

From the values given in Table 1 it can be seen that the synthetic hemihydrate in accordance with the invention possesses a very high specific surface area; in accordance with the Blaine method this is 1.67 times greater than for plaster of Paris and 2.68 times greater than for once calcined synthetic hemihydrate, and in accordance with the BET method, 1.82 times greater than for plaster of Paris and 2.96 times greater than for once calcined synthetic hemihydrate. The values given for synthetic hemihydrate in accordance with the invention can in no case be obtained with once calcined synthetic hemihydrate. In these values is reflected the considerably improved quality of the synthetic hemihydrate in accordance with the invention, both in comparison with once calcined synthetic hemihydrate and also in comparison with plaster of Paris.

The small particle form of a calcium sulfate hemihydrate is an important characteristic for its properties as far as working up is concerned. Plaster of Paris has spherical, flaky and vey fine small particles with surfaces which are full of fissures, whereby good working up properties are obtained. Synthetic hemihydrate in accordance with the invention has particles with similar shape to those of plaster of Paris, but has, however, a still smaller cross-sectional particle size than plaster of Paris. This is because of the values of the specific surface area and has an advantageous effect on the quality.

The particle shape of known once calcined synthetic hemihydrate is, however, completely different from the particle shape of the two types of calcium sulfate hemihydrate mentioned above. These particles have an extended small leaf shape structure, right through to spar shaped structure, with a length of approximately 300 $\mu$m. and a thickness of approximately 50 $\mu$m. The shape of these particles is unfavourable in all operations in which once calcined synthetic hemihydrate has to be moved, for instance in transporting in bucket conveyors and worms. In working up this once calcined synthetic hemihydrate in the form of a gypsum water slurry thixotropic effects occur, conditioned by the particle shape; for instance, such gypsum water slurry when at rest has a stiff appearance; but if it is caused to be put into movement, it flows apart as diluted slurry; also it is very difficult to mix such once calcined synthetic hemihydrate with water, since the extended particles set up great resistance to the stirring process. A gypsum slurry of this type applied to the wall as plaster runs off, and there is what is called curtain formation. Once calcined synthetic hemihydrate cannot be used as plaster of Paris for these reasons.

From FIGS. 1 and 2, the great differences in the particle shape between synthetic hemihydrate in accordance with the invention and once calcined synthetic hemihydrate can be seen. The particle shape of the synthetic hemihydrate in accordance with the invention, advantageously for good working up properties, is to be obtained only via the route described in this application of recrystallizing and renewed calcining. Only in this way is the unfavourable and thixotropic flowing behaviour of the once calcined synthetic hemihydrate obviated.

Figure 3:
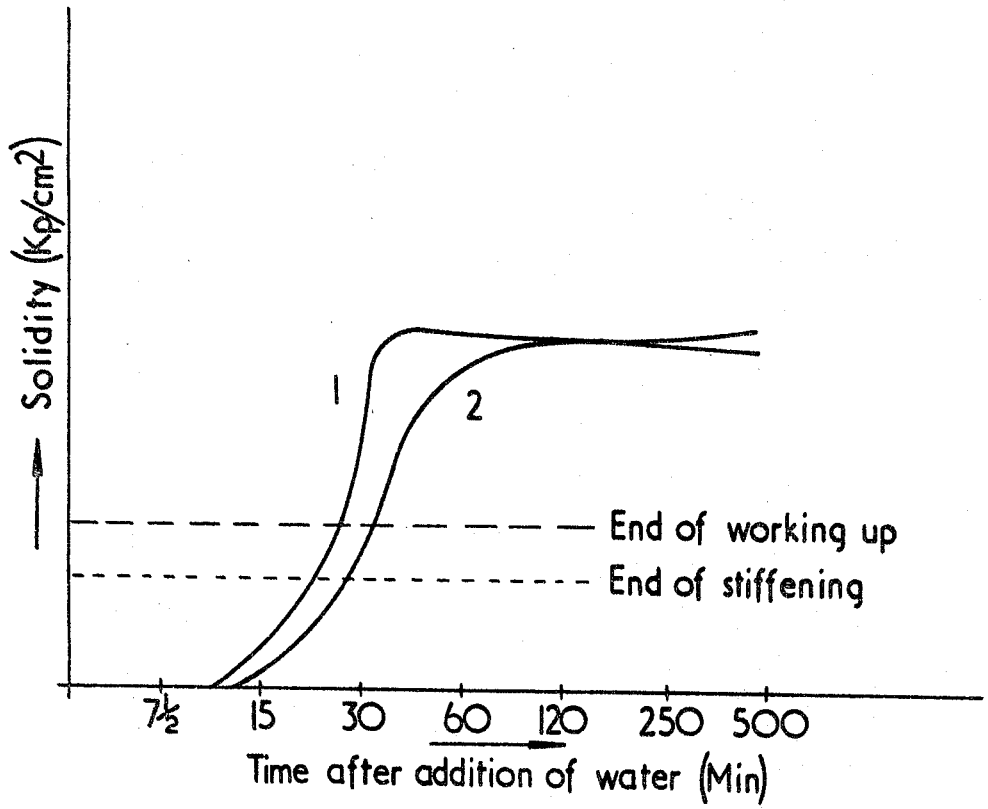

A further advantageous property of the synthetic hemihydrate in accordance with the invention is to be seen in FIG. 3 which shows the progress with time of the solidification of plaster of Paris (curve 1) mixed with water and of the synthetic hemihydrate in accordance with the invention (curve 2) mixed with water. The solidity of the gypsum slurry (kp./cm.²) is plotted in the ordinates, and the time (min.) after the addition of water in the abscissae. On a comparison of the two graph lines, the somewhat slower rise of the solidification curve of the twice calcined synthetic hemihydrate in accordance with the invention in comparison with plaster of Paris can be clearly seen. In the horizontal part of both graph lines (from approximately 50–60 min.) a lesser, but noticeable drop in solidity is to be observed for plaster of Paris, which in practical application is defined as "weakening of the solidification" and is not desirable. This weakening of solidification is not present with the synthetic hemihydrate in accordance with the invention. There is even a low increase in strength. An important improvement in quality is to be seen in this property, which up to the present was not possible, though it was always desired.

The solidification curve for once calcined synthetic hemihydrate corresponds to the solidification curve for plaster of Paris and is therefore not illustrated.

The production of calcium sulfate hemihydrate by the detour of calcining calcium sulfate dihydrate to form calcium sulfate hemihydrate, recrystallization to form dihydrate and renewed calcining to form twice calcined synthetic hemihydrate at first does not appear to be economical.

However the technical progress and the increase in quality which are achieved with the method outlined here, have led to new, advantageous knowledge in gypsum technology. They have furthermore had the result of making a product of highest quality from a waste product, and of giving this product economical application.

In a preferred embodiment of the invention, contaminated dihydrate is washed with water and filtered and then treated by means of a centrifuging apparatus. The dihydrate is contaminated with water-soluble phosphoric acid or its water-soluble salts and after centrifuging has a residual moisture content of 12–15%.

This moist contaminated dihydrate is subjected to a first calcining. In this process, the contaminated dihydrate located in a container is heated to a temperature between 150° C. and 200° C. The contaminated dihydrate is accordingly calcined under the same conditions as those which are customary for the calcining of plaster of Paris from natural gypsum. Thereby the contaminated dihydrate is dehydrated and converted into a gypsum intermediate product contaminated with water-soluble phosphoric acid and its water-soluble salts. This contaminated gypsum intermediate product consists substantially of calcium sulphate hemihydrate. It can, however, contain also a little calcium sulfate anhydrite.

A suspension of hydrate of lime in water is then added to this contaminated gypsum intermediate product. The suspension is produced by mixing hydrate of lime and water. For 1 metric ton of contaminated gypsum intermediate product, a suspension of 20 kg. lime in 180 l. water is used. The suspension is added to the contaminated gypsum intermediate product slowly, preferably via a granulator, so that granulated materials form which change slowly into a calcium sulfate dihydrate.

It is particularly advantageous for the water portion of the suspension to correspond to the water stoichiometrically necessary for the transition of the calcium sulfate hemihydrate into the calcuim sulfate dihydrate, and for there to be added to the once calcined calcium sulfate hemihydrate. 1% by weight to 10% by weight of hydrate of lime. It is obvious that the percentages given fluctuate within corresponding limits in accordance with the composition of the contaminated dihydrate.

As a variation of the above, the contaminated gypsum intermediate product is mixed dry with portland cement. This mixture is slowly mixed with water. In this case, per 1 metric ton gypsum intermediate product, 30 kg. portland cement and 190 kg. water may suitably be used.

Further examples of the neutralisation step are given below:

Example of the precipitation of phosphoric acid and its water-soluble compounds with urotropin and ferric sulfate 1000 g. of contaminated gypsum intermediate product were dry mixed with 10 g. of urotropin. Thus, the ratio of intermediate product:urotropin is about 100:1. Then a solution of 20 g. of ferric sulphate in 190 g. of water (a ratio of ferric sulfate:water of about 2:19) was slowly added with stirring to this mixture of intermediate product and urotropin. After conversion of the intermediate product into dihydrate this latter no longer contained free phosphoric acid and water-soluble phosphoric acid compounds.

The following reactions can take place between the precipitants urotropin and ferric-sulphate used in this reaction and the primary calcium phosphate:

$$Ca(H_2PO_4)_2 + Fe_2(SO_4)_3 + \text{urotropin} \longrightarrow$$
$$2FePO_4 + CaSO_4 + 2H_2SO_4$$
$$\text{iron phosphate, water-insoluble}$$

Example using a contaminated gypsum intermediate product the pH value of which is greater than about 4.5

Contaminated dihydrate was calcined to a contaminated gypsum intermediate product under the same calcining conditions used for converting natural gypsum to plaster of Paris. 1000 g. of this intermediate product were slowly mixed with a solution of 20 g. ferric sulfate in 190 g. water to form the dihydrate and water-insoluble compound. Thus, the ratio of intermediate product:ferric sulfate:water is about 100:2:19.

After the conversion of the contaminated gypsum intermediate product to calcium sulfate dihydrate, this contains no free phosphoric acid and no water-soluble phosphoric acid compounds. Therefore the calcined synthetic hemihydrate from this calcium sulfate dihydrate contains no free phosphoric acid or any water-soluble phosphoric acid compounds. The synthetic hemihydrate produced in accordance with the above-described method is accordingly a material which can be used to a great advantage in the building trade.

In the following tables, some of the properties of the once-calcined synthetic hemihydrate obtained by calcination of contaminated dihydrate and synthetic hemihydrate in accordance with the invention are compared with those of plaster of Paris in order to illustrate the invention. The synthetic hemihydrate was produced as described above using 20 kg. lime and 180 kg. water to 1000 kg. of contaminated gypsum intermediate product.

Moulded bodies, size 4 x 4 x 16 cm., were cast from a mixture of 1000 g. of the hemihydrate concerned and 715 g. water with further additions as detailed below.

Table 2 shows the Brinell hardness of various bodies in the first hours of setting. The plaster bodies were prepared from plaster of Paris, from once-calcined synthetic hemihydrate and from synthetic hemihydrate in accordance with the invention, in each case with 1% added lime.

TABLE 2

| | Brinell hardness (kg./cm.²) of plaster bodies after (hours)— | | | | | |
|---|---|---|---|---|---|---|
| | 1 | 2 | 3 | 4 | 5 | 24 |
| Plaster of Paris [1] | 108 | 109 | 109 | 108 | 106 | 99 |
| Once-calcined hemihydrate [1] | 28 | 38 | 39 | 40 | 43 | 52 |
| Synthetic hemihydrate in accordance with the invention [1] | 123 | 125 | 144 | 137 | 149 | 141 |

[1] With 1% lime.

It can be seen from Table 2 that the plaster bodies from once-calcined synthetic hemihydrate with addition of 1% lime only reach a quarter to a half of the hardness in the first 24 hours of that obtained using the synthetic hemihydrate in accordance with the invention or plaster of Paris. A sufficient hardness in the first hours of setting is of decisive importance in the successful use of the plaster.

In Table 3 is shown how different amounts of lime affect the Brinell hardness of plaster bodies 2 hours after preparation.

TABLE 3

| | Brinell hardness (kg./cm.²) of plaster bodies 2 hours after their preparation with the addition of the following percentages of lime— | | | | |
|---|---|---|---|---|---|
| | 0.5 | 1.0 | 4.3 | 8.6 | 40.0 |
| Plaster of Paris | 108 | 108 | 100 | 95 | 55 |
| Once-calcined hemihydrate | 16 | 39 | 58 | 67 | 23 |
| Synethic hemihydrate in accordance with the invention | 121 | 125 | 127 | 126 | 68 |

It is clear from Table 3 how large the variations are in hardnes of the plaster body using once-calcined synthetic hemihydrate and adding different amounts of lime. These variations are not present with plaster of Paris and with the synthetic hemihydrate in accordance with the invention. The strengths of the synthetic hemihydrates according to the invention reach or exceed those of the plaster of Paris, while the strengths of the once-calcined synthetic hemihydrate are about a half or less.

The strength of the once-calcined synthetic hemihydrate in dry, hard form depends, if lime is added, essentially upon the added amount of lime. It may be seen from this that the lime- or alkali-sensitivity of the once-calcined synthetic hemihydrate has its effect not only on rate of hardening but also upon the final strength of the products.

The synthetic hemihydrate according to the invention does not have this disadvantage. Thus, it was determined, for example, that the dry strength decreases markedly upon addition of some 0.2% to 1.5% (by weight) of lime to the once-calcined synthetic hemihydrate.

In the following Table 4 this is numerically illustrated by showing the dry strength using plaster of Paris, once-calcined synthetic hemihydrate and the synthetic hemihydrate according to the invention each with 0.5 wt. percent and 1.0 wt. percent of lime added, dried at 40° C.

TABLE 4

| | Dry strength (kg./cm.²) | | | | | |
|---|---|---|---|---|---|---|
| | Addition of 0.5% lime | | | Addition of 1.0% lime | | |
| | Transverse strength | Compressive strength | Brinell Hardness | Transverse strength | Compressive strength | Brinel Hardness |
| Plaster of Paris | 65 | 160 | 310 | 61 | 165 | 300 |
| Once-calcined synthetic hemihydrate | 21 | 41 | 115 | 22 | 81 | 163 |
| Synthetic hemihydrate in accordance with the invention | 60 | 170 | 300 | 61 | 165 | 306 |

It can be seen from Table 4, that with addition of 0.5% by weight and 1.0% by weight of lime to the once-calcined synthetic hemihydrate the dry strength of the bodies prepared therefrom are a half to a quarter as large as those with the synthetic hemihydrate according to the invention and with plaster of Paris.

The sensitivity of the once-calcined synthetic hemihydrate for this small amount of lime is especially dangerous since this can easily arise by contamination at the building site or by mixing lime-contaminated sand into the plaster, and accordingly make it completely unusable. The significance of the invention is also clear from this example.

The time of setting and the water-carrying capacity were determined in accordance with the methods given in German Standard DIN 1168 corresponding to those in "ASTM Designation C26-54, Standard Methods of Testing Gypsum and Gypsum Products," and the results are given in Table 5.

TABLE 5

| | Time of setting, min. | Water-carrying capacity [1] |
|---|---|---|
| Plaster of Paris | 10-12 | 130-140 |
| Once calcined synthetic hemihydrate | 4-6 | 150-160 |
| Synethic hemihydrate in accordance with the invention | 10-12 | 95-105 |

[1] Grams of hemihydrate per 100 g. water.

We claim:
1. A method for manufacturing calcium sulfate hemihydrate ($CaSO_4$—$0.5H_2O$) from calcium sulfate dihydrate ($CaSO_4 \cdot 2H_2O$) contaminated by containing water-soluble phosphoric acid or its water-soluble salts, comprising calcining the contaminated dihydrate to form a contaminated gypsum intermediate product, mixing this calcined intermediate product with water and at least one neutralizing agent selected from the group consisting of lime, hydrates of lime, cement which contains lime, urotropin, ferric sulfate and mixtures thereof, to form calcium sulfate dihydrate and water-insoluble compounds of the contaminants and then dehydrating this calcium sulfate dihydrate by a second calcination to form calcium sulfate hemihydrate.

2. A method according to claim 1 wherein said calcium sulphate hemihydrate, produced by said first calcination is converted into calcium sulphate dihydrate by mixing the calcine, at a pH value of more than about 4.5, with a solution of ferric sulfate in water at a ratio of about 100:2:19 thereby forming water-insoluble compounds by reaction with said phosphoric acid or its water-soluble salts.

3. A method according to claim 1 wherein said calcium sulphate hemihydrate, produced by said first calcination, is converted into calcium sulphate dihydrate by mixing the calcine dry with urotropin at a ratio of about 100:1 and then adding to this resulting mixture with agitation, a solution of ferric sulphate in water at a ratio of about 2:19 thereby forming water-insoluble compounds by reaction with said phosphoric acid or its water-soluble salts.

References Cited

UNITED STATES PATENTS

| | | | |
|---|---|---|---|
| 1,900,381 | 3/1933 | Hansen | 106—110 |
| 3,159,497 | 12/1964 | Yamaguchi | 106—110 |

JAMES E. POER, Primary Examiner

U.S. Cl. X.R.

106—111; 23—122